US012631728B2

(12) United States Patent
Dax et al.

(10) Patent No.: US 12,631,728 B2
(45) Date of Patent: May 19, 2026

(54) SYSTEM AND METHOD FOR INTERPRETABLE MOTION PREDICTION AND VEHICLE NAVIGATION

(71) Applicants: Honda Motor Co., Ltd., Tokyo (JP); The Board of Trustees of the Leland Stanford Junior University, Stanford, CA (US)

(72) Inventors: Victoria Magdalena Dax, Stanford, CA (US); Jiachen Li, Mountain View, CA (US); Enna Sachdeva, Santa Clara, CA (US); Nakul Agarwal, San Francisco, CA (US); Mykel J. Kochenderfer, Palo Alto, CA (US)

(73) Assignees: Honda Motor Co., Ltd., Tokyo (JP); The Board of Trustees of the Leland Stanford Junior University, Stanford, CA (US)

( * ) Notice: Subject to any disclaimer, the term of this patent is extended or adjusted under 35 U.S.C. 154(b) by 227 days.

(21) Appl. No.: 18/615,648

(22) Filed: Mar. 25, 2024

(65) Prior Publication Data

US 2025/0199123 A1 Jun. 19, 2025

Related U.S. Application Data

(60) Provisional application No. 63/609,480, filed on Dec. 13, 2023.

(51) Int. Cl.
*G01S 7/48* (2006.01)
*G01S 17/06* (2006.01)
*G01S 17/89* (2020.01)

(52) U.S. Cl.
CPC ............ *G01S 7/4808* (2013.01); *G01S 17/06* (2013.01); *G01S 17/89* (2013.01)

(58) Field of Classification Search
CPC ......... G01S 7/4808; G01S 17/06; G01S 17/89
See application file for complete search history.

(56) References Cited

U.S. PATENT DOCUMENTS

2019/0205785 A1* 7/2019 Volk ......................... G06N 5/04

OTHER PUBLICATIONS

A. Alahi, K. Goel, V. Ramanathan, A. Robicquet, L. Fei-Fei, and S. Savarese, "Social LSTM: Human trajectory prediction in crowded spaces," in IEEE Computer Society Conference on Computer Vision and Pattern Recognition (CVPR), 2016.
(Continued)

*Primary Examiner* — Georgia Y Epps
*Assistant Examiner* — Don J Williams
(74) *Attorney, Agent, or Firm* — Rankin, Hill & Clark LLP

(57) ABSTRACT

A sensor system includes a ranged sensor that generates time-series data indicating positions of objects in an environment, and at least one processor that receives the time-series data generated by the ranged sensor, encodes the time-series data into edge embeddings with an encoder, and computes edge features and edge logits of the objects in the environment, represented in a latent space, based on the edge embeddings. The at least one processor also disentangles the edge features in the latent space, and generates a representation of time-invariant latent characteristics of interactions between the edge features in the latent space.

20 Claims, 11 Drawing Sheets

(56) References Cited

OTHER PUBLICATIONS

C. Brewitt, B. Gyevnar, S. Garcin, and S. Albrecht, "Grit: Fast, interpretable, and verifiable goal recognition with learned decision trees for autonomous driving," in IEEE/RSJ International Conference on Intelligent Robots and Systems (IROS), 2021.

E. Binshaflout, H. Ghazzai, and Y. Massoud, "Graph neural networks for traffic pattern recognition: An overview," in IEEE International Conference on Smart Mobility, 2023.

J. Bock, R. Krajewski, T. Moers, S. Runde, et al., "The inD dataset: A drone dataset of naturalistic road user trajectories at German intersections," in IEEE Intelligent Vehicles Symposium (IV), 2020.

A. Gabbay and Y. Hoshen, "Latent optimization for non-adversarial representation disentanglement," in International Conference on Learning Representations (ICLR), 2020.

C. Graber and A. Schwing, "Dynamic neural relational inference," in IEEE Computer Society Conference on Computer Vision and Pattern Recognition (CVPR), 2020.

A. Gupta, J. Johnson, L. Fei-Fei, S. Savarese, and A. Alahi, "Social GAN: Socially acceptable trajectories with generative adversarial networks," in IEEE Computer Society Conference on Computer Vision and Pattern Recognition (CVPR), 2018.

I. Higgins, L. Matthey, A. Pal, et al., "Beta-VAE: Learning basic visual concepts with a constrained variational framework," in International Conference on Learning Representations (ICLR), 2017.

I. Higgins, A. Pal, A. A. Rusu, L. Matthey, et al., "Darla: Improving zero-shot transfer in reinforcement learning," in International Conference on Machine Learning (ICML), 2017.

B. Ivanovic and M. Pavone, "The Trajectron: Probabilistic multiagent trajectory modeling with dynamic spatiotemporal graphs," in International Conference on Computer Vision (ICCV), 2019.

T. Kipf, E. Fetaya, K.-C. Wang, M. Welling, and R. Zemel, "Neural relational inference for interacting systems," in International Conference on Machine Learning (ICML), 2018.

P. Kothari, B. Stringer, and A. Alahi, "Interpretable social anchors for human trajectory forecasting in crowds," in IEEE Computer Society Conference on Computer Vision and Pattern Recognition (CVPR), 2021.

D. Lee, Y. Gu, J. Hoang, and M. Marchetti-Bowick, "Joint interaction and trajectory prediction for autonomous driving using graph neural networks," in Advances in Neural Information Processing Systems (NeurIPS), 2019.

N. Lee, W. Choi, P. Vernaza, C. B. Choy, et al., "DESIRE: Distant future prediction in dynamic scenes with interacting agents," in IEEE Computer Society Conference on Computer Vision and Pattern Recognition (CVPR), 2017.

Y. Li, Y. Ji, S. Li, S. He, et al., "Relevance-aware anomalous users detection in social network via graph neural network," in International Joint Conference on Neural Networks (IJCNN), 2021.

J. Li, F. Yang, M. Tomizuka, and C. Choi, "Evolvegraph: Multiagent trajectory prediction with dynamic relational reasoning," in Advances in Neural Information Processing Systems (NeurIPS), 2020.

J. Li, F. Yang, H. Ma, S. Malla, et al., "Rain: Reinforced hybrid attention inference network for motion forecasting," in International Conference on Computer Vision (ICCV), 2021.

J. Li, H. Ma, Z. Zhang, J. Li, and M. Tomizuka, "Spatio-temporal graph dual-attention network for multi-agent prediction and tracking," in IEEE Transactions on Intelligent Transportation Systems, 2021.

L. Li, J. Yao, L. K. Wenliang, T. He, et al., "GRIN: Generative relation and intention network for multi-agent trajectory prediction," in Advances in Neural Information Processing Systems, 2021.

M. Li, S. Chen, et al., "Online multi-agent forecasting with interpretable collaborative graph neural networks," IEEE Transactions on Neural Networks and Learning Systems, pp. 1-15, 2022.

C. J. Maddison, A. Mnih, and Y. W. Teh, "The concrete distribution: A continuous relaxation of discrete random variables," in International Conference on Learning Representations (ICLR), 2017.

A. Mohamed, K. Qian, M. Elhoseiny, and C. Claudel, "Social-stgcnn: A social spatio-temporal graph convolutional neural network for human trajectory prediction," in IEEE Computer Society Conference on Computer Vision and Pattern Recognition (CVPR), 2020.

E. Sachdeva and C. Choi, "Dider: Discovering interpretable dynamically evolving relations," IEEE Robotics and Automation Letters, vol. 7, pp. 1-8, Oct. 2022.

E. Sachdeva, N. Agarwal, S. Chundi, et al., "Rank2tell: A multimodal driving dataset for joint importance ranking and reasoning," in IEEE Winter Conference on Applications of Computer Vision, 2024.

A. Sadeghian, V. Kosaraju, A. Sadeghian, N. Hirose, and S. Savarese, "SoPhie: An attentive gan for predicting paths compliant to social and physical constraints," in IEEE Computer Society Conference on Computer Vision and Pattern Recognition (CVPR), 2017.

W. Samek, T. Wiegand, and K.-R. Müller, "Explainable artificial intelligence: Understanding, visualizing and interpreting deep learning models," arXiv preprint arXiv:1708.08296, 2017.

F.-Y. Sun, I. Kauvar, R. Zhang, et al., "Interaction modeling with multiplex attention," in Advances in Neural Information Processing Systems (NeurIPS), 2022.

L. Sun, C. Tang, Y. Niu, E. Sachdeva, et al., "Domain knowledge driven pseudo labels for interpretable goal-conditioned interactive trajectory prediction," in IEEE/RSJ International Conference on Intelligent Robots and Systems (IROS), 2019.

C. Tang, N. Srishankar, S. Martin, and M. Tomizuka, "Grounded relational inference: Domain knowledge driven explainable autonomous driving," arXiv preprint, 2021.

W. Wang, L. Wang, C. Zhang, C. Liu, and L. Sun, "Social interactions for autonomous driving: A review and perspectives," Foundations and Trends in Robotics, vol. 10, pp. 198-376, Mar. 4, 2022.

Y. Wang, Y. Sun, Z. Liu, S. E. Sarma, et al., "Dynamic graph CNN for learning on point clouds," in IEEE Computer Society Conference on Computer Vision and Pattern Recognition (CVPR), 2018.

C. Yu, X. Ma, J. Ren, H. Zhao, and S. Yi, "Spatio-temporal graph transformer networks for pedestrian trajectory prediction," in European Conference on Computer Vision (ECCV), 2020.

R. Zhou, H. Zhou, H. Gao, M. Tomizuka, J. Li, and Z. Xu, "Grouptron: Dynamic multi-scale graph convolutional networks for group-aware dense crowd trajectory forecasting," in IEEE International Conference on Robotics and Automation (ICRA), 2022.

* cited by examiner

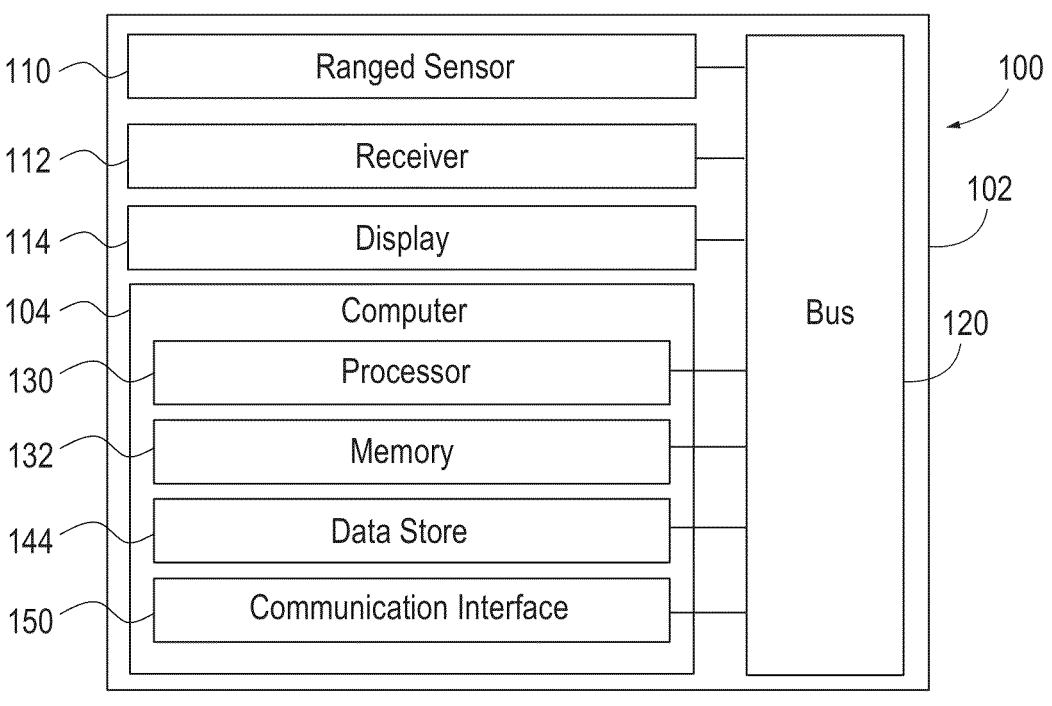
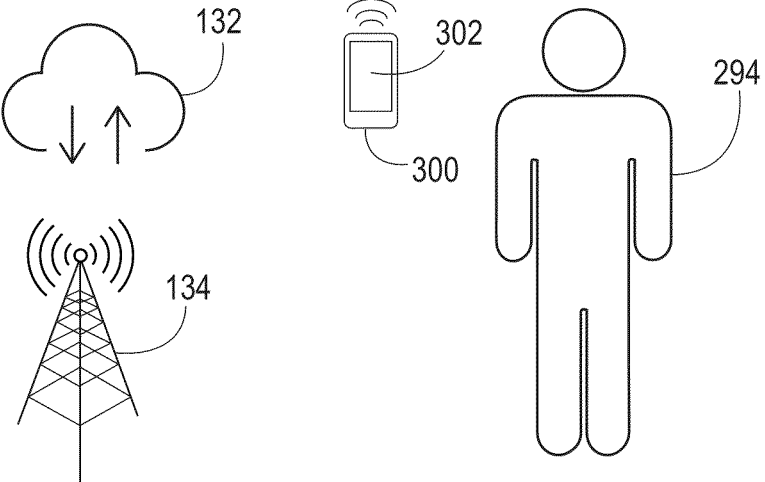
FIG. 1

Restricted Labeling $p(x, SI)$          Pair Matching $p(x,x')$

TABLE I: Performance comparison for NBA dataset

| Model | RMSE [m] | min ADE [m] | min FDE [m] | Connectivity |
|---|---|---|---|---|
| Linear | $1.027 \pm 1.00 \times 10^{-2}$ | $1.038 \pm 9.45 \times 10^{-3}$ | $4.118 \pm 1.52 \times 10^{-2}$ | – |
| LSTM | $0.884 \pm 3.55 \times 10^{-3}$ | $0.830 \pm 2.02 \times 10^{-3}$ | $2.895 \pm 1.03 \times 10^{-2}$ | – |
| IMMA | $1.036 \pm 9.41 \times 10^{-3}$ | $0.965 \pm 9.99 \times 10^{-3}$ | $2.922 \pm 1.75 \times 10^{-2}$ | – |
| dNRI | $1.140 \pm 5.09 \times 10^{-3}$ | $0.802 \pm 3.18 \times 10^{-3}$ | $4.080 \pm 2.05 \times 10^{-2}$ | 0.678 |
| dG-VAE (ours) | $0.876 \pm 4.19 \times 10^{-3}$ | $0.547 \pm 1.84 \times 10^{-3}$ | $3.199 \pm 1.39 \times 10^{-2}$ | 1.000 |
| dG-VAE + pair matching | $\mathbf{0.579} \pm 4.06 \times 10^{-3}$ | $\mathbf{0.381} \pm 1.78 \times 10^{-3}$ | $\mathbf{2.166} \pm 1.48 \times 10^{-2}$ | 0.999 |

FIG. 7

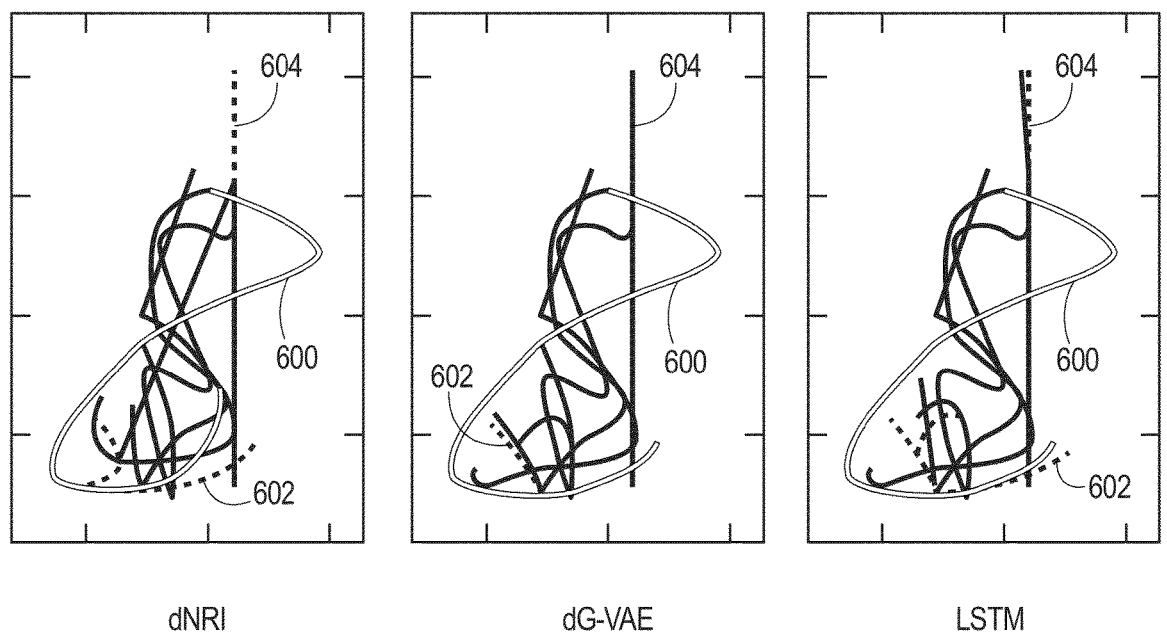

dNRI          dG-VAE          LSTM

FIG. 8

TABLE II: Performance comparison for 5-Spring dataset

| Model | RMSE [m] | min ADE [m] | min FDE [m] | OOD min ADE [m] | OOD min FDE [m] |
|---|---|---|---|---|---|
| Linear | $0.196 \pm 9.36 \times 10^{-4}$ | $0.202 \pm 9.81 \times 10^{-4}$ | $0.446 \pm 2.31 \times 10^{-3}$ | $2.158 \pm 1.03 \times 10^{-2}$ | $3.541 \pm 2.02 \times 10^{-2}$ |
| LSTM | $0.037 \pm 5.12 \times 10^{-3}$ | $0.024 \pm 6.54 \times 10^{-3}$ | $0.159 \pm 1.33 \times 10^{-2}$ | $0.406 \pm 1.39 \times 10^{-3}$ | $1.485 \pm 1.13 \times 10^{-2}$ |
| IMMA | $0.162 \pm 1.15 \times 10^{-3}$ | $0.176 \pm 1.25 \times 10^{-3}$ | $0.350 \pm 2.66 \times 10^{-3}$ | $1.389 \pm 5.75 \times 10^{-3}$ | $1.934 \pm 1.16 \times 10^{-2}$ |
| dNRI | $0.114 \pm 4.69 \times 10^{-4}$ | $0.058 \pm 2.32 \times 10^{-4}$ | $0.469 \pm 2.29 \times 10^{-3}$ | $0.379 \pm 1.11 \times 10^{-3}$ | $1.372 \pm 9.17 \times 10^{-3}$ |
| dG-VAE (ours) | $0.019 \pm 1.16 \times 10^{-4}$ | $0.011 \pm 5.71 \times 10^{-5}$ | $0.048 \pm 3.50 \times 10^{-4}$ | $0.302 \pm 1.02 \times 10^{-3}$ | $1.063 \pm 6.82 \times 10^{-3}$ |
| dG-VAE + restricted lab. | $0.016 \pm 7.25 \times 10^{-5}$ | $0.010 \pm 3.65 \times 10^{-5}$ | $0.063 \pm 3.49 \times 10^{-4}$ | $0.309 \pm 1.35 \times 10^{-3}$ | $1.032 \pm 1.09 \times 10^{-2}$ |

FIG 9

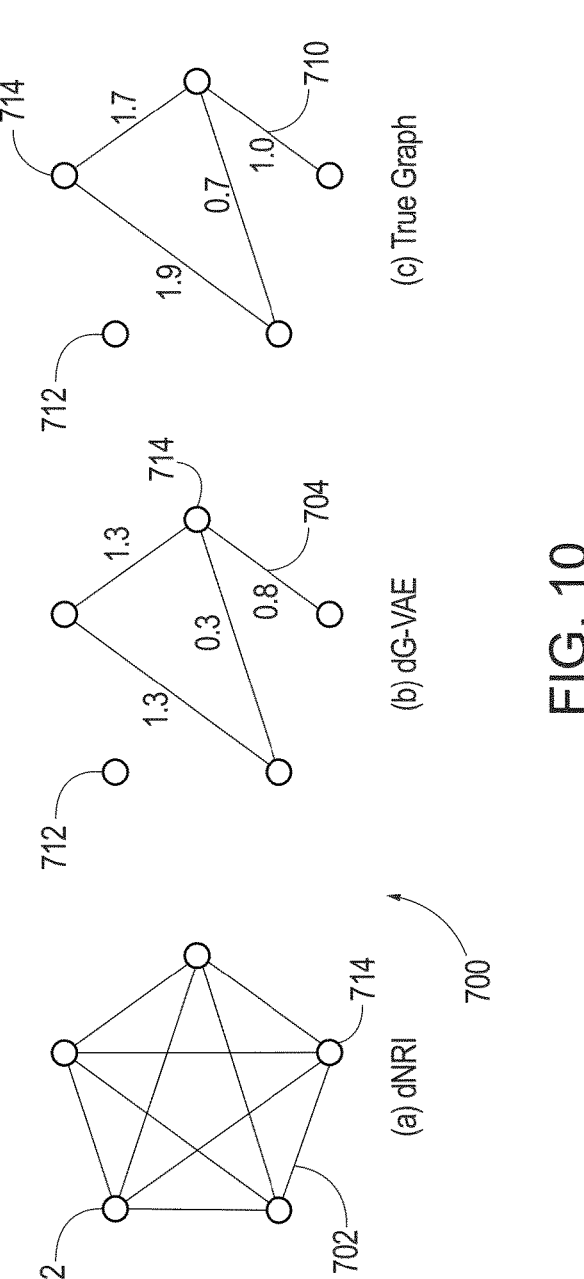

(a) dNRI (b) dG-VAE (c) True Graph

FIG. 10

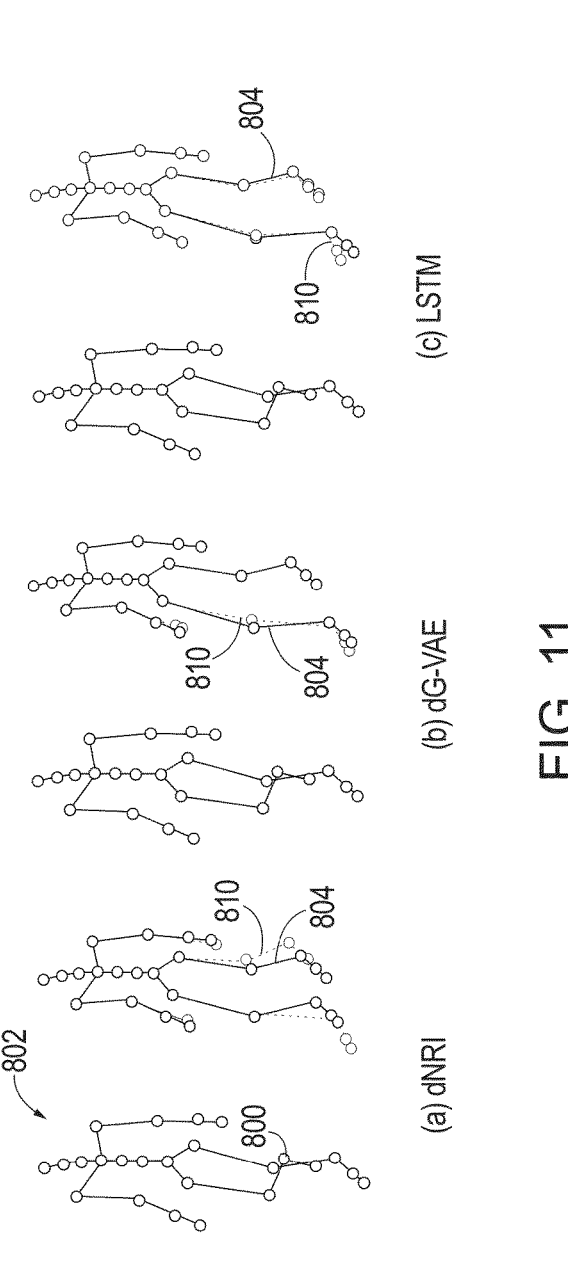

(a) dNRI (b) dG-VAE (c) LSTM

FIG 11

TABLE III: Performance comparison for Motion Capture (#35) dataset

| Model | #35 | | | #39 | |
| | RMSE [m] | min ADE [m] | min FDE [m] | min ADE [m] | min FDE [m] |
| --- | --- | --- | --- | --- | --- |
| Linear | $2.726 \pm 4.74 \times 10^{-2}$ | $3.989 \pm 6.16 \times 10^{-2}$ | $4.493 \pm 1.25 \times 10^{-1}$ | $5.466 \pm 2.91 \times 10^{-1}$ | $5.750 \pm 6.55 \times 10^{-1}$ |
| LSTM | $0.208 \pm 7.04 \times 10^{-3}$ | $0.167 \pm 4.77 \times 10^{-3}$ | $0.829 \pm 2.85 \times 10^{-2}$ | $0.291 \pm 1.86 \times 10^{-2}$ | $1.398 \pm 1.07 \times 10^{-1}$ |
| IMMA | $0.418 \pm 9.99 \times 10^{-3}$ | $0.583 \pm 1.36 \times 10^{-1}$ | $1.081 \pm 2.45 \times 10^{-1}$ | $J.274 \pm 2.00 \times 10^{-2}$ | $2.328 \pm 3.24 \times 10^{-2}$ |
| dNRI | $0.161 \pm 2.60 \times 10^{-3}$ | $0.145 \pm 1.19 \times 10^{-3}$ | $0.699 \pm 1.29 \times 10^{-2}$ | $0.228 \pm 5.89 \times 10^{-3}$ | $1.124 \pm 6.88 \times 10^{-2}$ |
| dG-VAE (ours) | $\mathbf{0.068} \pm 1.33 \times 10^{-3}$ | $\mathbf{0.075} \pm 1.36 \times 10^{-3}$ | $\mathbf{0.294} \pm 5.68 \times 10^{-3}$ | $0.168 \pm 8.85 \times 10^{-3}$ | $0.790 \pm 4.45 \times 10^{-2}$ |
| dG-VAE +pair matching | $0.088 \pm 3.80 \times 10^{-3}$ | $0.083 \pm 2.04 \times 10^{-3}$ | $0.344 \pm 1.12 \times 10^{-2}$ | $\mathbf{0.167} \pm 6.89 \times 10^{-3}$ | $\mathbf{0.786} \pm 4.91 \times 10^{-2}$ |

FIG. 12

A subset of stationary features learned by dG-V AE

TABLE IV: Performance comparison for inD dataset

| Model | RMSE [m] | inD | | roundD | |
| | | min ADE [m] | min FDE [m] | min ADE [m] | min FDE [m] |
| --- | --- | --- | --- | --- | --- |
| dNRI | $1.080 \pm 3.14 \times 10^{-2}$ | $0.561 \pm 3.14 \times 10^{-2}$ | $4.290 \pm 1.67 \times 10^{-1}$ | $4.831 \pm 0.086$ | $37.077 \pm 0.966$ |
| dG-VAE (ours) | $\textbf{1.056} \pm 2.83 \times 10^{-2}$ | $\textbf{0.486} \pm 1.44 \times 10^{-2}$ | $\textbf{4.285} \pm 1.04 \times 10^{-1}$ | $4.958 \pm 0.076$ | $38.985 \pm 1.146$ |
| dG-VAE + pair matching | $1.104 \pm 5.55 \times 10^{-2}$ | $0.558 \pm 1.57 \times 10^{-2}$ | $4.441 \pm 3.36 \times 10^{-1}$ | $\textbf{4.384} \pm 0.111$ | $\textbf{34.848} \pm 1.279$ |

| | 1002 |
| --- | --- |
| Generating the time-series data | |

| | 1004 |
| --- | --- |
| Receiving the time-series data | |

| | 1010 |
| --- | --- |
| Encoding the time-series data | |

| | 1012 |
| --- | --- |
| Computing the edge features and the edge logits | |

| | 1014 |
| --- | --- |
| Disentangling the edge features in the latent space | |

| | 1020 |
| --- | --- |
| Optimizing the encoder using a loss function | |

| | 1022 |
| --- | --- |
| Generating a representation of time-invariant latent characteristics | |

| | 1024 |
| --- | --- |
| Predicting a future state of the objects | |

1100

1112

1110

COMPUTER
INSTRUCTIONS

1104

01011010001010
10101011010101
101101011100...

1102

COMPUTER READABLE
MEDIUM

SYSTEM AND METHOD FOR INTERPRETABLE MOTION PREDICTION AND VEHICLE NAVIGATION

BACKGROUND

Understanding and modeling complex interactions among dynamic agents is important to various applications and tasks, including robotics, traffic modeling and management, and social network analysis. In the field of robotics, one downstream task is multi-agent trajectory prediction, which serves as a prerequisite for high-quality decision making and motion planning in complex and crowded scenarios. Modeling inter-agent interactions may be crucial to understanding the joint dynamic behavior of the agents. For instance, the joint prediction of two vehicles approaching an intersection requires modeling and reasoning about their potential interactions, such as yielding, overtaking, or not interacting at all.

Recent approaches have focused on modeling interactions among agents by inferring latent interaction graphs, where edges represent different types of interactions. However, these methods are limited to inferring categorical relations and are not equipped to capture more nuanced characteristics. For example, while these models may identify whether or not a pair of particles is connected by a spring, they are unable to infer its elastic coefficient. Furthermore, these methods focus on minimizing distance-based prediction errors in test cases that align with the observed data distribution. By primarily evaluating their methods using in-distribution samples, they overlook out-of-distribution situations, where models may encounter unseen and challenging interaction patterns between agents or diverse environmental contexts. This limits both the interpretability and generalizability of the existing works, which undermines the reliability of prediction models and proves inadequate for critical applications such as autonomous driving.

BRIEF DESCRIPTION

According to one aspect, a sensor system includes a ranged sensor that generates time-series data indicating positions of objects in an environment, and at least one processor that receives the time-series data generated by the ranged sensor, encodes the time-series data into edge embeddings with an encoder, and computes edge features and edge logits of the objects in the environment, represented in a latent space, based on the edge embeddings. The at least one processor also disentangles the edge features in the latent space, and generates a representation of time-invariant latent characteristics of interactions between the edge features in the latent space.

According to another aspect, a method for generating a representation of time-invariant latent characteristics includes generating time-series data of objects in an environment with a ranged sensor, and causing at least one processor to receive the time-series data generated by the ranged sensor, encode the time-series data into edge embeddings with an encoder, and compute edge features and edge logits of the objects in the environment, represented in a latent space, based on the edge embeddings. The method also includes causing the processor to disentangle the edge features in the latent space, and generate a representation of time-invariant latent characteristics of interactions between the edge features in the latent space.

According to another aspect, a non-transitory computer readable storage medium storing instructions that, when executed by at least one processor, causes the at least one processor to perform a method. The method includes generating time-series data of objects in an environment with a ranged sensor, encoding the time-series data into edge embeddings with an encoder, and computing edge features and edge logits of the objects in the environment, represented in a latent space, based on the edge embeddings. The method also includes disentangling the edge features in the latent space, and generating a representation of time-invariant latent characteristics of interactions between the edge features in the latent space.

BRIEF DESCRIPTION OF THE DRAWINGS

FIG. 1 is an exemplary operating environment of a sensor system.

FIG. 7 shows Table I, which summarizes testing statistics for the dNRI model, the sensor system, and the LSTM model with respect to the first dataset.

FIG. 8 is a top view of predicted trajectories overlaying ground truth trajectories generated by the dNRI model, the sensor system, and the LSTM model based on a second dataset.

FIG. 9 shows Table II, which summarizes testing statistics for the dNRI model, the sensor system, and the LSTM model with respect to the second dataset.

FIG. 10 is a diagram of inferred graphs produced by the dNRI model and the sensor system, compared to a ground truth graph.

FIG. 11 is a perspective view of predicted trajectories overlaying ground truth trajectories generated by the dNRI model, the sensor system, and the LSTM model based on a third dataset.

FIG. 12 shows Table III, which summarizes testing statistics for the dNRI model, the sensor system, and the LSTM model with respect to the third dataset.

FIG. 15 shows Table IV, which summarizes testing statistics for the dNRI model and the sensor system with respect to the fourth dataset.

DETAILED DESCRIPTION

Figure 2:
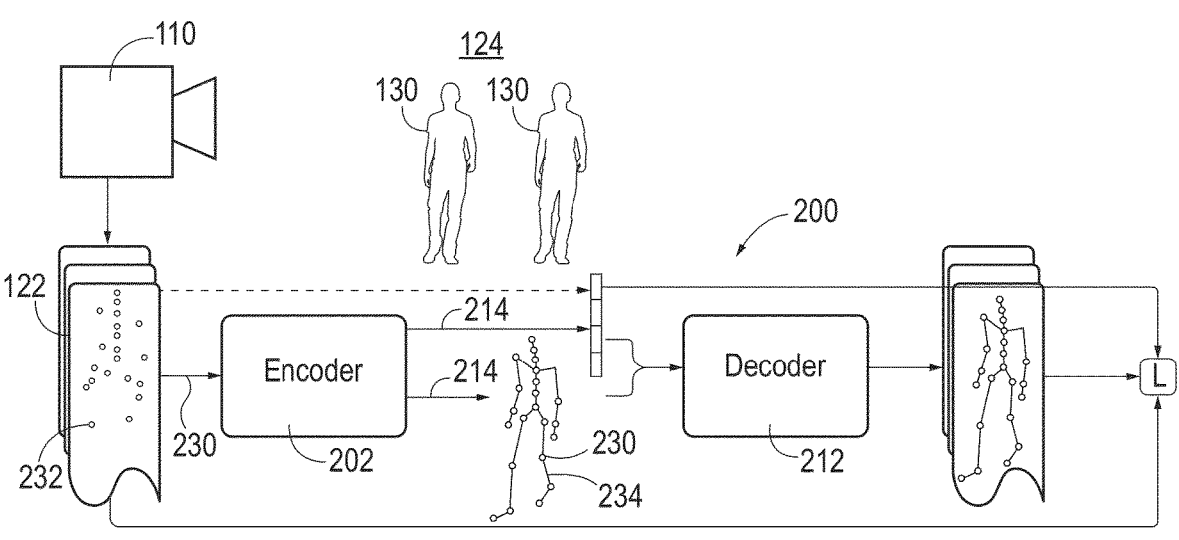
FIG. 2 is a diagram of a learning framework.

The systems and methods disclosed herein include a learning framework configured to determine time-invariant latent characteristics of interactions between objects in an environment by modeling edge features of the objects in a latent space. The learning framework is also configured to predict a future state of the objects in the environment based on the determined time-invariant latent characteristics. A vehicle including the disclosed systems may perform autonomous travel based on at least one of determined time-invariant latent characteristics of other vehicles, and a predicted future state of the other vehicles in an external environment surrounding the vehicle.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also interconnect with components inside a device using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, connected thermometer, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), among others.

Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE, CAT-M, LoRa), satellite, dedicated short range communication (DSRC), among others.

"Communication interface" as used herein may include input and/or output devices for receiving input and/or devices for outputting data. The input and/or output may be for controlling different features, components, and systems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device or mobility device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms. The processor may also include any number of modules for performing instructions, tasks, or executables.

"User" as used herein may be a biological being, such as humans (e.g., adults, children, infants, etc.).

A "wearable computing device," as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user in a surrounding environment.

System Overview

Referring now to the drawings, the drawings are for purposes of illustrating one or more exemplary embodiments and not for purposes of limiting the same. FIG. 1 is an exemplary component diagram of an operating environment 100 of a sensor system 102 including a computer 104, a ranged sensor 110, a receiver 112, and a display 114.

Each of the computer 104, the ranged sensor 110, the receiver 112, and the display 114 are operatively connected with each other and may be interconnected by a bus 120. The components of the operating environment 100, as well as the components of other systems, hardware architectures, and software architectures discussed herein, may be combined, omitted, or organized into different architectures for various embodiments.

As shown in FIG. 2, the ranged sensor 110 is configured to generate time-series data 122 of an environment 124, including objects 130 in the environment 124, and transmit the time-series data 122 to the computer 104. The ranged sensor 110 may include a combination of optical, infrared, or other cameras for generating the time-series data 122. The data ranged sensor 110 may additionally or alternatively include light detection and ranging (LiDAR) systems, position sensors, proximity sensors, microphones, and a variety of other sensors and sensor combinations for generating the time-series data 122 in a manner similar to known systems, including systems provided in vehicles for detecting other vehicles at a distance, and therefore will not be described in detail.

Referring back to FIG. 1, the computer 104 is implemented as a part of the sensor system 102, and connected to an external server 132 via a network 134. The computer 104 may be capable of providing wired or wireless computer communications utilizing various protocols to send and receive electronic signals internally to and from components of the operating environment 100. Additionally, the computer 104 may be operably connected for internal computer communication via the bus 120 (e.g., a Controller Area Network (CAN) or a Local Interconnect Network (LIN) protocol bus) to facilitate data input and output between the computer 104 and the components of the operating environment 100.

The computer 104 includes a processor 140, a memory 142, a data store 144, and a communication interface 150, which are each operably connected for computer communication via the bus 120. The communication interface 150 provides software and hardware to facilitate data input and output between the components of the computer 104 and other components, networks, and data sources described herein.

FIG. 2 depicts a learning framework 200 that incorporates the sensor system 102. The learning framework 200 includes an encoder 202 and a decoder 212. Functions of the encoder 202 and the decoder 212 described herein may be performed by the processor 140, and may additionally or alternatively be performed by the external server 132 over the network 134.

The encoder 202 and the decoder 212 together form a variational autoencoder (VAE) configured for determining interpretable interactions from observations of the objects 130 in the environment 124. By using an inference-based approach that disentangles time-invariant features, the VAE demonstrates interpretability and improved generalizability in out-of-distribution (OOD) settings. In this regard, integrating interpretable components and inference-based learning allows a model supported by the VAE to capture and understand more complex interactions, leading to more reliable and robust predictions.

The encoder 202 receives the time-series data 122 generated by the ranged sensor 102, and encodes the time-series data 122 into edge embeddings 214. In this regard, the encoder 202 maps input data x from the time-series data 122 to a lower-dimensional latent variable z, represented by a probability distribution $q_\theta(z|x)$. In the described embodiment, the probability distribution is a Gaussian distribution with a learnable mean and covariance.

During training, the encoder 202 is optimized for a reconstruction objective, which ensures that generated samples resemble the original data. The encoder 202 is also optimized for a regularization objective, which encourages a learned latent space to have a specific structure p(z), such as the Gaussian distribution. As described in greater detail below, the encoder 202 is optimized for the reconstruction objective and the regularization objective simultaneously. The resulting loss function may be written as a combination of a reconstruction error and a Kullback-Leibler (KL) divergence between approximate and true posterior distributions, which is also known as an evidence lower bound (ELBO).

The encoder 202 is configured to learn to approximate a true posterior distribution of the latent variable z given the input data x. The decoder 212 maps the latent variable z back to the original data space, such that the decoder 212 learns the conditional probability distribution $p_\phi(x|z)$ of the input data x given the latent variable z.

For each agent i present at time step t, the encoder 202 processes a history $x_{t-H+1:t}^{(i)}$ of the agent i indicated in the time-series data 122, where H denotes the history horizon. The encoder 202 and the decoder 212 are configured to predict a distribution of future states $$p\left(y^{(i)}\middle|\{x_{t-H+1:t}^{(j)}\middle|\forall\ j \in \{1,\ \dots\ ,\ N(t)\}\}\right)$$

for upcoming T steps. Here, $$y^{(i)} = \hat{x}_{t+1:t+T}^{(i)} \in R^{T \times N(t) \times d},$$

where state dimension d represents the predicted future trajectory of agent i.

Figure 3:
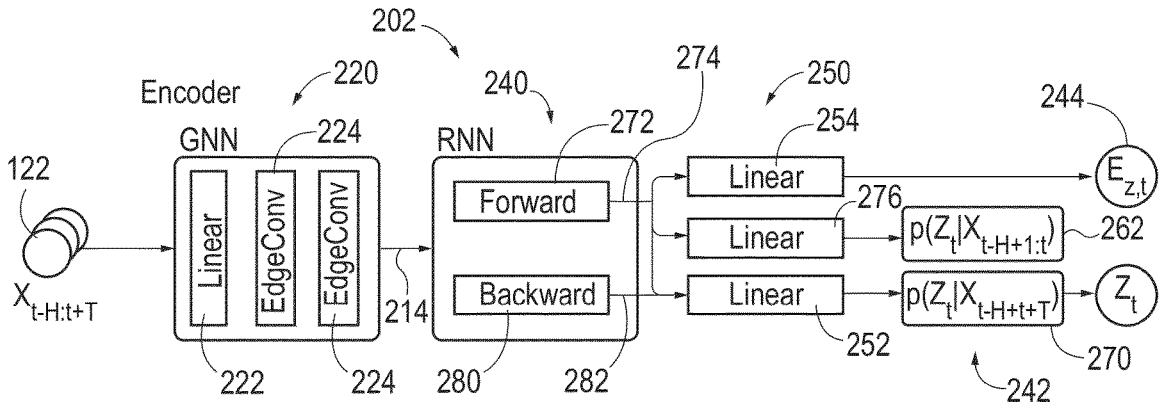
FIG. 3 is a diagram of a variational autoencoder (VAE) included in the sensor system.

With reference to FIG. 3, the encoder 202 includes a graph neural network (GNN) 220 having a linear embedding 222 followed by an edge convolutional layer 224 configured to concatenate node embeddings 230 in the time-series data 122, and generate the edge embeddings 214 from the concatenated node embeddings 230. While, as depicted, the GNN 220 includes two edge convolutional layers 224, the GNN 220 may include more or fewer edge convolutional layers 224 without departing from the scope of the present disclosure.

The GNN 220 processes graph-structured data by iteratively passing and aggregating messages between neighboring nodes in the GNN 220. The edge embeddings 214 are edge-level embeddings generated by the GNN 220, and describe nodes 232 and edge features 234 representing the objects 130 in the environment 124.

The linear embedding 222 and the edge convolutional layer 224 processing the time-series data 122 in the GNN 220 may be represented by the following equation (1):

$$x_{i,t}' = \sum_{j \in N_t(i)} h_\Theta(x_{i,t}||x_{j,t} - x_{i,t})$$

With reference to equation (1) above, $h_\Theta$ denotes a neural network such as, for example, a multilayer perceptron (MLP) neural network, and || indicates the concatenation of two node embeddings, $x_{j,t}$ and $x_{i,t}$. The node embeddings $x_{j,t}$, $x_{i,t}$ are obtained from the time-series data 122 by at least one of the processor 140 and the external server 132. The node embeddings 230 and the nodes 232 may additionally or alternatively be generated by a computing system included in the ranged sensor 110 such that the processor 140 receives the node embeddings 230 from the ranged sensor 110 with the time-series data 122.

With this construction, the GNN 220 aggregates messages from neighboring nodes 232 to update the node embeddings 230 at each iteration of training conducted between the encoder 202 and the decoder 212, described in greater detail below. The edge convolutional layer 224 is adapted to produce the edge embeddings 214 as edge-level embeddings, and may be represented by the following equation (2):

$$e_{ij,t}' = h_\Theta(x_{i,t}||x_{j,t})$$

The edge embeddings 214 produced by the GNN 220 according to equations (1) and (2) above are forwarded to a recurrent neural network (RNN) 240 included in the encoder 202. The RNN 240 has a long short-term memory (LSTM) layer configured to receive and process the edge embeddings 214 from the GNN 220, and the processor 140 computes the edge features 234 and edge logits 242 of the objects 130 in the environment 124 based on the edge embeddings 214 processed by the RNN 240. The edge logits 242 describe a likelihood of the edge features 234 existing in a latent space based on observed histories of travel by the objects 130 in the environment 124. A matrix 244 of the edge features 234 produced alongside the edge logits 242 is expressed as $E_t$.

The LSTM layer in the RNN 240 processes the edge embeddings 214 using an exponential linear unit (ELU) activation function. The RNN 240 also includes a dropout layer which excludes individual nodes in the encoder 202 from activation during training based on a probability.

With continued reference to FIG. 3, the encoder 202 stores a hidden state of the RNN 240 during training, and transmits the edge embeddings 214 to MLP blocks 250. The MLP blocks 250 include a first MLP block 252 and a second MLP block 254 that are each MLP heads composed of two linear layers having ELU activation functions.

The edge logits 242 include prior edge logits 262 which may be expressed as $p(z_t|X_{t-H+1:t})$, where $z_t$ represents a latent variable 264. The edge logits 242 also include posterior edge logits 270 that may be expressed as $p(z_t|X_{t-H:t+T})$. When training and operating the encoder 202, the first MLP head 252 computes the posterior edge logits 270, and the second MLP head 254 computes the matrix 244 of the edge features 234 from the edge embeddings 214 produced by the GNN 220. In this manner, the RNN 240 computes the edge features 234 and the edge logits 242 of the objects 130 in the environment 124, represented in the latent space, based on the edge embeddings 214.

The RNN 240 includes a forward RNN 272 that generates a forward embedding 274 to the MLP blocks 250 and a dynamic neural relational interface (dNRI) 276 based on the edge embeddings 214 received from the GNN 220. The RNN 240 also includes a backward RNN 280 that generates a backward embedding 282 based on the edge embeddings 214 from the GNN 220.

With continued reference to FIG. 3, the second MLP head 254 receives the forward embedding 274 from the forward RNN 272, and computes the edge features 234, expressed as $E_{z,t}$, based on the forward embedding 274. The dNRI 276 is included in the encoder 202, receives the forward embedding 274 from the forward RNN 272, and computes the prior edge logits 262 based on the forward embedding 274.

The first MLP head 252 receives the forward embedding 274 from the forward RNN 272, receives the backward embedding 282 from the backward RNN 280, and computes the posterior edge logits 270 based on the forward embedding 274 and the backward embedding 282. In this manner, the first MLP head 252 generates the posterior edge logits 270 computed using future information, i.e. the forward embedding 274 in conjunction with the backward embedding 282. The encoder 202 trains the prior edge logits 262 to match the posterior edge logits 270 trained using the future information.

During training, the processor 140 samples the latent variable 264 from the prior edge logits 262. In this regard, the encoder 202 returns a distribution of possible relations between edge features 234 based on the time-series data 122, and the processor 140 adopts a concrete distribution that is a continuous proxy to a discrete categorical distribution. With this construction, sampling by the processor 140 is differentiable, and enables backpropagating weight updates in the encoder 202. This sampling technique uses reparameterization by first sampling a vector g from a known distribution such as, for example, GUMBEL(0, 1), and then processing the vector g and the posterior in a normalized exponential function that may be expressed as the following equation (3):

$$zij, t = \text{SOFTMAX}\left((\hat{z}ij, t + g)/\tau\right)$$

With reference to equation (3) above, $$\hat{z}_t^{(ij)}$$

represents the posterior logits at time t, and $\tau$ adjusts a smoothness of the distribution. Notably, this construction approximates discrete sampling in a gradient-friendly manner, allowing the encoder 202 to receive feedback from reconstruction by the decoder 212.

The processor 140 optimizes the encoder 202 during training using a loss function that includes a generative loss which measures a difference between input and output of a model supported by the encoder 202. The loss function performed by the processor 140 also includes a latent loss which compares a latent vector to a Gaussian distribution with zero mean and unit variance. The loss function performed by the processor 140 is a negative log-likelihood loss that may be expressed as the following equation (4):

$$NLL = \frac{1}{T} \sum_{t \in [T]} \sum_{j \in [d]} \frac{1}{2\sigma}(z_{t,j} - y_{t,j})^2$$

With reference to equation (4) above, in an embodiment, $\sigma = 5.0 \times 10^{-5}$ as a hyperparameter. The processor 140 further performs a KL-divergence algorithm using the learned prior edge logits 262 to evaluate latent loss of probability distributions p(z|X) and p(z), that may be expressed as the following equation (5):

$$KL = \sum_{t \in [T]} \left( -\sum_z p(z_t \mid X)\log p(z_t \mid X, z_{1:t-1}) \right)$$

Disentanglement of the edge features 234 in the latent space enables interpretable edge feature learning that may be evaluated by a user 294 (see FIG. 1). Referring back to FIG. 1, in an embodiment, the sensor system 102, including the computer 104 and the ranged sensor 110, is incorporated into a portable device 300. The portable device 300 is operatively connected to the external server 132 via the network 134. The user 294 may operate the portable device 300, including the ranged sensor 110, through a display 302 as a user interface to generate image data of the objects 130 in the environment 124. With this construction, the computer 104 may process the time-series data 122 on-site as captured by the ranged sensor 110. The computer 104 may also generate a representation of time-invariant latent characteristics on the display 114, and display predicted future states of the objects 130 in the environment 124 using the display 302, based on the representation of time-invariant latent characteristics.

Figure 4:
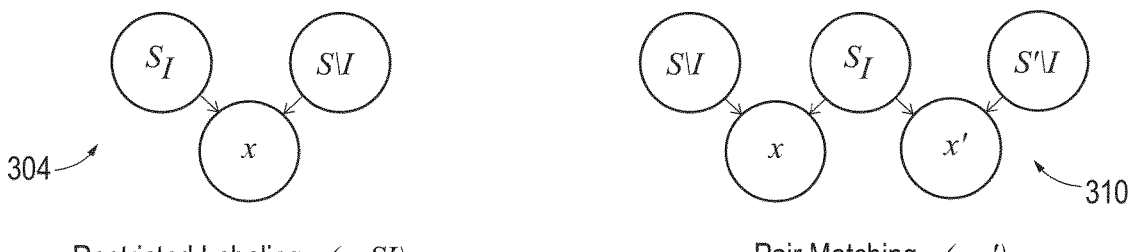
FIG. 4 is a diagram of disentanglement methods that may be performed by the VAE.

As shown in FIG. 4, the encoder 202 may disentangle the edge features 234 using a restricted labeling method 304, which is a supervised method that matches distributions of the edge logits 242 based on observed x and a subset of ground truth features $s_1$. As the encoder 202 processes the matrix 244 of the edge features 234, the encoder 202 directs certain learned variables, including the latent variable 264, to align with specified attributes using an additional loss.

In the depicted embodiment, the specified attribute is a spring constant, such that the loss function causes the encoder 202 to infer a spring constant from the learned variables of the edge features 234. The encoder 202 applies regression to parts of a predicted feature matrix guided by the known spring constants during training. Although the actual spring constants are unknown during testing, the model supported by the encoder 202 is conditioned to infer them.

With this construction basing the model of the encoder 202 on a feature with known semantics and predictive implications, interpretability and performance of the model is enhanced. While, as described, the encoder 202 infers spring constants from interactions between the edge features 234 in the latent space, the restricted labeling method 304 may additionally or alternatively be used to determine damping and other analogous mechanical characteristics advantageous for modeling and predicting interactions between the objects 130 in the environment 124 without departing from the scope of the present disclosure.

With continued reference to FIG. 4, the encoder 202 may additionally or alternatively disentangle the edge features 234 using a pair matching method 310, which is an unsupervised method that determines a subset of common feature values, including the latent variable 264, in paired data (x, x'). The pair matching method 310 is an unsupervised method in that does not rely on the underlying values of ground truth features $s_1$ but correlates with indices thereof.

In the pair matching method 310, the processor 140 records the edge features 234 as time-series data in the matrix 244 of edge features 234, and then disentangles the edge features 234 in the latent space using a pair matching algorithm that samples the matrix 244 to generate a sampled matrix indicating time-series data of the edge features 234. The encoder 202 averages the edge features 234 recorded in the sampled matrix over time to determine time-invariant features, and populates the matrix 244 with the time-invariant features to determine the time-invariant latent characteristics of edge interactions between the edge features 234 in the latent space, including the latent variable 264.

The sampling in the pair matching method 310 is performed sequentially. As such, the pair matching method 310 does not require double sampling from a fixed source of data. With this construction, performance by the pair matching method 310 is not limited to a fixed source of data, and the encoder 202 can be continually optimized without limitations due to input data store sizes.

In this manner, by disentangling the edge features 234 in the latent space, the encoder 202 generates a representation of the time-invariant latent characteristics of interactions between the edge features 234 in the latent space, based on the latent variable 264. While the described methods of disentanglement includes the restricted labeling method 304 and the pair matching method 310, other methods of disentanglement, including supervised methods and unsupervised methods, may be employed for disentangling the edge features 234 in the latent space without departing from the scope of the present disclosure.

Referring back to FIG. 2, the processor 140 predicts a future state of the objects 130 in the environment 124 with the decoder 212, which receives and processes the edge embeddings 214 from the encoder 202. The decoder 212 includes an edge convolutional layer that generates node embeddings from the edge embeddings 214, and may be expressed as the following equation (6):

$$x'_{i,t} = \sum_{j \in N_t(i) | z_t} h_\Theta(x_{i,t} \| x_{j,t} \| e_{ij,t})$$

The decoder 212 includes a gated recurrent unit (GRU) layer that processes the node embeddings from the edge convolutional layer with a linear readout. The GRU layer performs ELU activation when processing the node embeddings from the edge convolutional layer.

Figure 5:
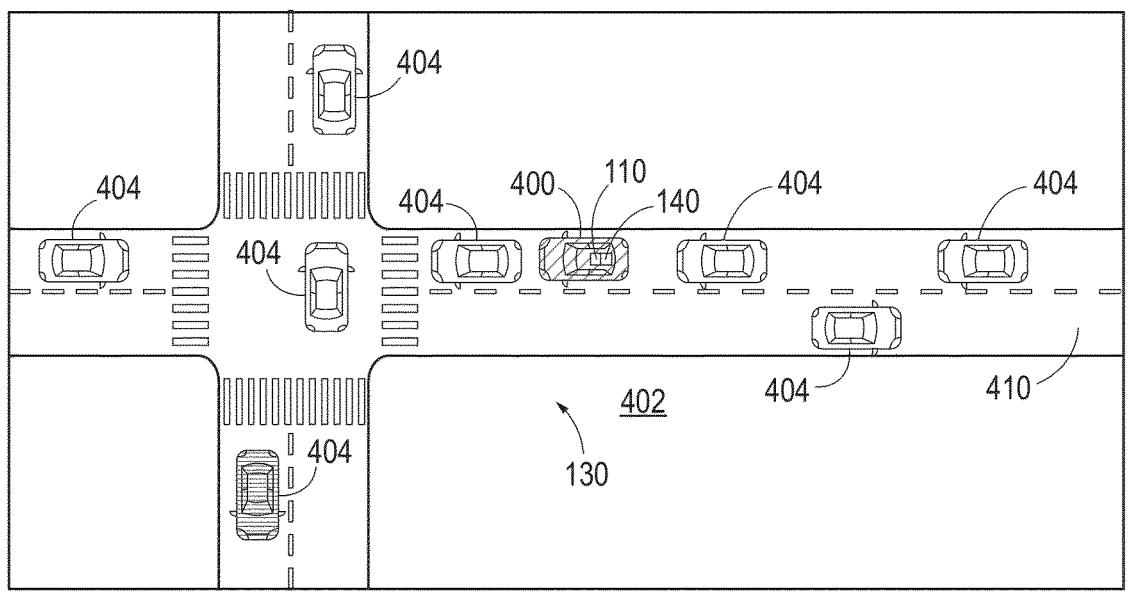
FIG. 5 is a top view of the sensor system in combination with a vehicle.

FIG. 5 depicts the sensor system 102 in combination with a vehicle 400 that includes the ranged sensor 110 and the processor 140. The ranged sensor 110 generates the time-series data 122 of the objects 130 in an external environment 402 surrounding the vehicle 400. As depicted, the objects 130 include other vehicles 404 on and near a road 410 to be navigated by the vehicle 400.

The processor 140, as the encoder 202, generates the representation of time-invariant latent characteristics of interactions between the edge features 234, the edge features 234 representing the other vehicles 404 in the latent space.

The processor 140, as the decoder 212, predicts a future state of the other vehicles 404 in the external environment 402 based on the representation of time-invariant latent characteristics generated by the encoder 202.

The processor 140 is an electronic control unit (ECU) configured to actuate autonomous travel by the vehicle 400. The processor 140 may actuate autonomous travel by the vehicle 400 based on the representation of time-invariant latent characteristics generated by the encoder 202, where the processor performs path planning for the vehicle 400 on the road 410 based on the determined time-invariant latent characteristics of interactions between the other vehicles 404. The processor 140 may additionally or alternatively perform path planning for the vehicle 400 and actuate autonomous travel by the vehicle 400 based on the predicted future state of the other vehicles 404 generated by the decoder 212. While, as depicted, the vehicle 400 is a car, the vehicle 400 may alternatively be a truck, scooter, moped, motorcycle, mobile robot, aerial vehicle, or other motorized vehicle configured for navigating traffic without departing from the scope of the present disclosure.

The sensor system 102 may be incorporated into a variety of apparatuses for performing motion prediction in a given environment. In this regard, an exemplary embodiment of the sensor system 102 was evaluated against a) a two-layer MLP, b) an LSTM layer with a hidden dimension of 128 located between two fully connected layers having hidden dimensions of 64, where the LSTM layer processes all agents simultaneously, c) interaction modeling with multiplex attention (IMMA), and d) a dNRI in a variety of scenarios described in detail below. The a) two-layer MLP includes a hidden dimension of 256 and rectified linear unit (ReLU) activation. The b) LSTM layer includes a hidden dimension of 128 located between two fully connected layers having hidden dimensions of 64, where the b) LSTM layer processes all agents simultaneously. The c) IMMA includes a forward prediction model that uses a multiplex latent graph to represent different types of interactions and attention. The d) dNRI includes a VAE model with recurrent GNN modules that re-evaluate a predicted latent graph dynamically.

The exemplary embodiment of the sensor system 102 was evaluated using four benchmark datasets. The datasets include a National Basketball Association (NBA) dataset, a Spring dataset, a Motion Capture dataset, and an inD dataset. The exemplary embodiment of the sensor system 102 is a dual Gaussian based variational autoencoder (dG-VAE) including a GNN component with a hidden dimension of 128, a RNN with a hidden dimension of 64, and read-out heads with a hidden dimension of 256. The dimension of edge feature embedding is set to 16 for the Spring dataset, 32 for the NBA dataset, 32 for the Motion Capture dataset, and 64 for the inD dataset, respectively. When temporal pair matching is performed, 16 nodes are allocated to temporal pair matching. A decoder RNN has a hidden dimension of 256. The sampler uses a Gumbel temperature of 0.5, which is the same as dNRI. The batch size and learning rate are set to 128, 2×10-4 for the NBA dataset, the Spring dataset, and the Motion Capture dataset, and 1, 5×10-4 for the inD dataset. The evaluation is performed on binary edge prediction to evaluate the impact of learned edge features without correlation bias. Each model was trained with an Adam optimizer for 150 epochs for the NBA dataset, the Spring dataset, and the Motion Capture dataset, and 400 epochs for the inD dataset.

The NBA dataset contains 100,000 examples, where 80,000 examples were allocated toward training, 10,000 examples were allocated toward validation, and 10,000 examples were allocated for testing, respectively. The NBA dataset features trajectories of all ten players and the ball present in an NBA game. Each trajectory has 50 time steps at a frequency of 3.0 Hz, which provides a prediction horizon of 3.6 s. A position and velocity of the trajectories is normalized and mean-shifted to a range of [−1, 1]. Notably, the sensor system 102 is not limited to interpreting the motion of only one team and the ball, but analyzes the performance of, and semantically understands each player and the ball on the court as the objects 130 in the environment 124.

Figure 6:
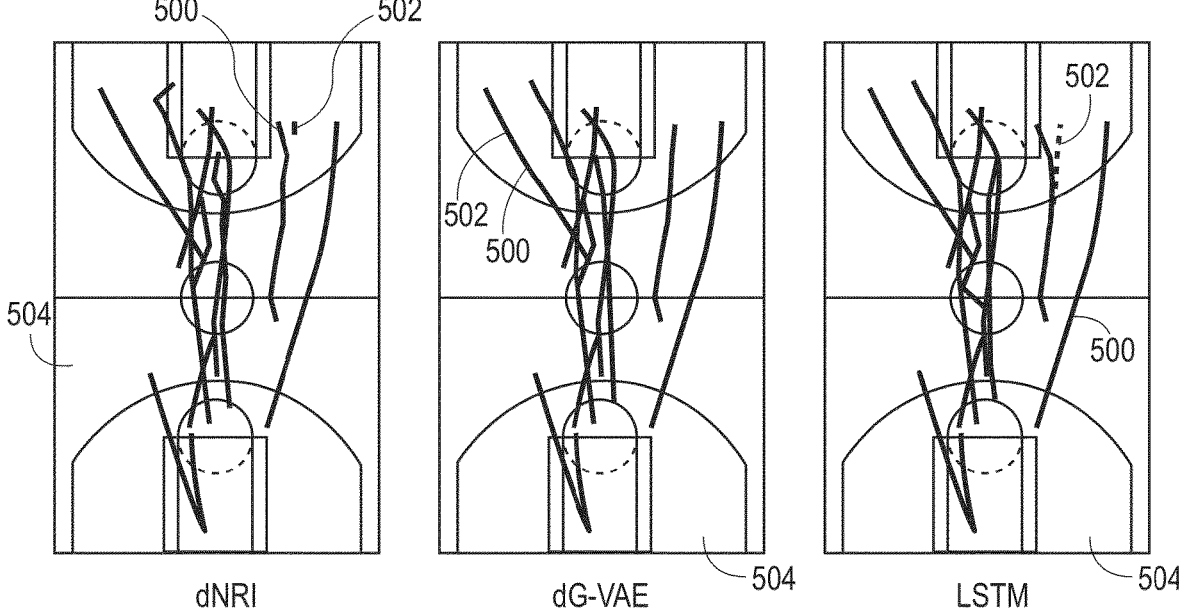
FIG. 6 is a top view of predicted trajectories overlaying ground truth trajectories generated by a dNRI model, the sensor system, and an LSTM model based on a first dataset.

FIG. 6 depicts predicted trajectories 500 overlaying ground truth trajectories 502 on a basketball court 504 generated by the dNRI model, the sensor system 102, and the LSTM model respectively, highlighting notable differences. As depicted, the predicted trajectories 500 are represented by solid curves, and the ground truth trajectories 502 are represented by dashed curves. In this regard, the sensor system 102 using the dG-VAE demonstrates a smaller deviation from the ground truth trajectories compared to the dNRI and the LSTM models.

FIG. 7 shows Table I, which summarizes testing statistics for different models, where the best values for each metric are highlighted in bold. Results summarized in Table I include a minimum average displacement error (minADE), which refers to the mean Euclidean distance between the ground truth and predicted trajectories. The results summarized in Table I also include a minimum final displacement error (minFDE), which refers to the Euclidean distance between the predicted final position and the ground truth at the prediction horizon. For minADE and minFDE, 20 predicted trajectories are randomly sampled, and the best value in the set is chosen. The results summarized in Table I also include a root mean squared error (RMSE).

With continued reference to Table I, the sensor system 102 outperforms the strongest baseline (dNRI) in all metrics by around 25% when edge features are learned and around 45% when the edge features are disentangled into temporal and static features, i.e., pair matched.

The dNRI model, which only predicts binary edges, converges to a 67% graph connectivity with the NBA dataset while the sensor system 102 convergences to a fully connected graph with the dG-VAE model. This implies that all agents on the basketball court 504, i.e. all players and the ball are to be considered when predicting a player's next moves. The sensor system 102 allows for this state where all interactions are relevant, as the augmented edge features add an expressivity that enables distinguishing between interactions.

The Spring dataset contains 70,000 examples that are total rollouts of simulated systems with N particles, where 50,000 examples were allocated toward training, 10,000 examples were allocated toward validation, and 10,000 examples were allocated for testing, respectively. In the present experiments, N=5.

In modeling the simulated systems, no external forces are applied, except elastic collisions with box boundaries. With a probability of 0.7, each pair of particles is connected with a spring. Interaction between particles linked by the springs is governed by Hooke's law, i.e., $F_{ij}=-k(r_i-r_j)$. Here, $F_{ij}$ represents a force exerted by particle $v_j$ on particle $v_i$. A spring constant is denoted by k and is uniformly sampled between 0.5 and 2, $r_i$ indicates the 2D coordinate of particle $v_i$, and $r_j$ indicates the 2D coordinate of particle $v_j$. The out-of-distribution data is sampled with a 0.5 probability of connection and spring constants of 1, 2, or 3. Given the initial locations and velocities, which are sampled from a multi-variate Gaussian, 50 time steps are simulated at a frequency of 6.0 Hz.

FIG. 8 depicts predicted trajectories 600 overlaying ground truth trajectories 602 of the particles in the Spring dataset, generated by the dNRI model, the sensor system 102, and the LSTM model respectively. As depicted, the predicted trajectories 600 are represented by solid curves, and the ground truth trajectories 602 are represented by dashed curves. A first trajectory 604 of a first particle travels upwards in the Spring dataset, while all other ground truth trajectories 602 cluster in a lower half of the depiction.

The sensor system 102 generates predicted trajectories 600 that are cleaner and closer to the ground truth trajectories 602 as compared to the dNRI model and the LSTM model. This is supported by numerical results shown in FIG. 9, under Table II. In addition to result metrics described with respect to Table I, Table II indicates graph accuracy, which is a percentage overlap between edges present in the ground truth graph and those present in the inferred graph.

As shown in Table II, the sensor system 102 outperforms all other approaches by almost an order of magnitude in measured accuracy. Notably, the addition of restricted labeling to the sensor system 102 yielded an additional 5% improvement in RMSE and ADE and, improves the graph accuracy by inferring spring constants. As such, the dNRI model has an accuracy of 0.877, while the sensor system 102 using the dG-VAE model with restricted labeling has an accuracy of 0.984.

FIG. 10 depicts inferred graphs 700 for the Spring dataset, including a first graph 702 generated by the dNRI model, and a second graph 704 generated by the sensor system 102. FIG. 10 also depicts a ground truth graph 710, indicating ground truth spring constants used in the simulation. While the dNRI model infers a fully connected graph, the sensor system 102 using the dG-VAE model shows a more adequate inference. In this regard, the sensor system 102 accurately inferred a first node 712 independent from other nodes 714 in the ground truth graph 710, the node 712 corresponding to the first trajectory 604 independent of the other ground truth trajectories 602.

The Motion Capture dataset evaluates efficacy of provided models using motion capture recordings sourced from a CMU Motion Capture database. The recordings were obtained through a motion capture system featuring 12 infrared cameras at a frequency of 120 Hz. As shown in FIG. 11, the Motion Capture dataset includes recordings that track movements across 31 distinct joints 800 of a subject body 802.

In this regard, the models analyze a first sequence from the CMU Motion Capture database which involves walking. The models also use a second sequence that tracks another test subject walking on uneven grounds as OOD samples.

FIG. 12 indicates results in processing the first sequence and the second sequence by the models in Table III. As shown in Table III, the sensor system 102 outperforms the dNRI model with a 45% improvement in accuracy. This improvement in accuracy is shown in FIG. 11, where a predicted future state 804 of the body 802 generated by a given model overlays a ground truth state 810. As shown in FIG. 11, the predicted future state 804 generated by the sensor system 102 using the dG-VAE model more accurately matches the corresponding ground truth state 810 than the predicted future states generated by the dNRI model and the LSTM model.

Figure 13:
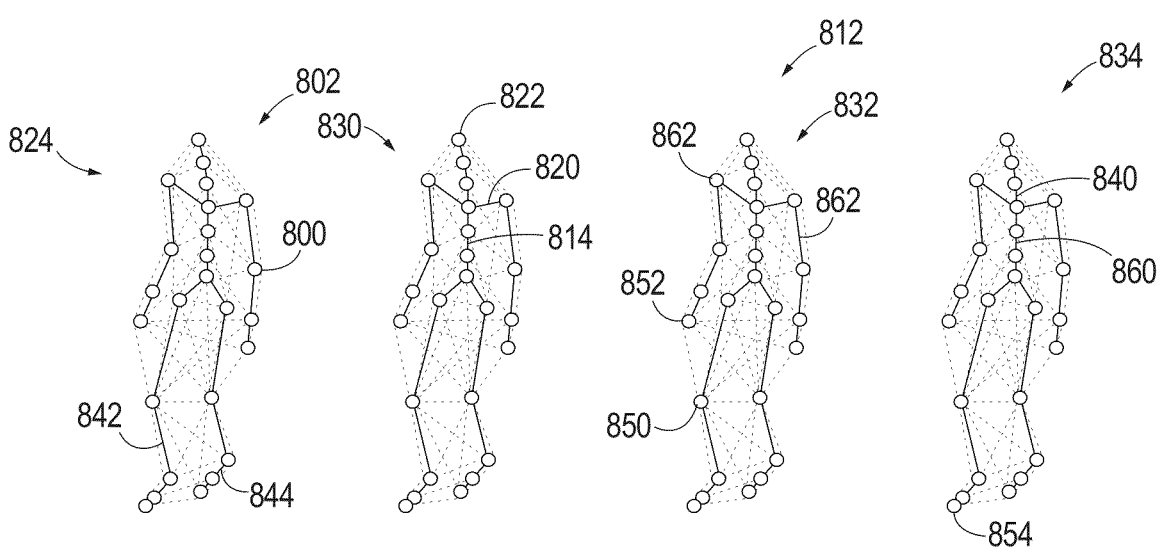
FIG. 13 is a perspective view of a subset of stationary features learned by the sensor system based on the third dataset.

FIG. 13 depicts a subset of stationary features 812 of the body 802 learned by the sensor system 102. Notably, relatively few features are associated with joints 800 along a centerline such as a core 814, shoulders 820, and head 822. This minimal correlation indicates that other factors play a more significant role in predicting future motion of the body 802.

Instead, the learned features 812 more strongly correlate with relatively distinct relations. The learned features 812 include a first feature 824, a second feature 830, a third feature 832, and a fourth feature 834. The first feature 824 showcases the main relation of an upper body 840 to a front leg 842, which suggests the first feature 824 might encode weight shifting when a step is taken by the body 802.

The second feature 830 encodes the relation from a left foot 844 and a knee 850 to a right hand 852 and one of the shoulders 820, and the third feature 832 encodes an opposite correlation between a right foot 854, a left hand 860, and one of the shoulders 820. These features highlight a common walking pattern where arms 862 of the body 802 swing synchronously with corresponding opposite legs 842.

The fourth feature 832 strongly relates all extremities, i.e., hands 852, 860 and feet 844, 854, and weakly links more stationary relations. This encoding, therefore, suggests a variance in distance. For example while the distance between the shoulders 820 remains relatively constant, the distance between the feet 844, 854 increases and decreases like a pendulum as each step is taken. In this manner, disentanglement introduces a new level of expressivity in output of the sensor system 102.

Figure 14:
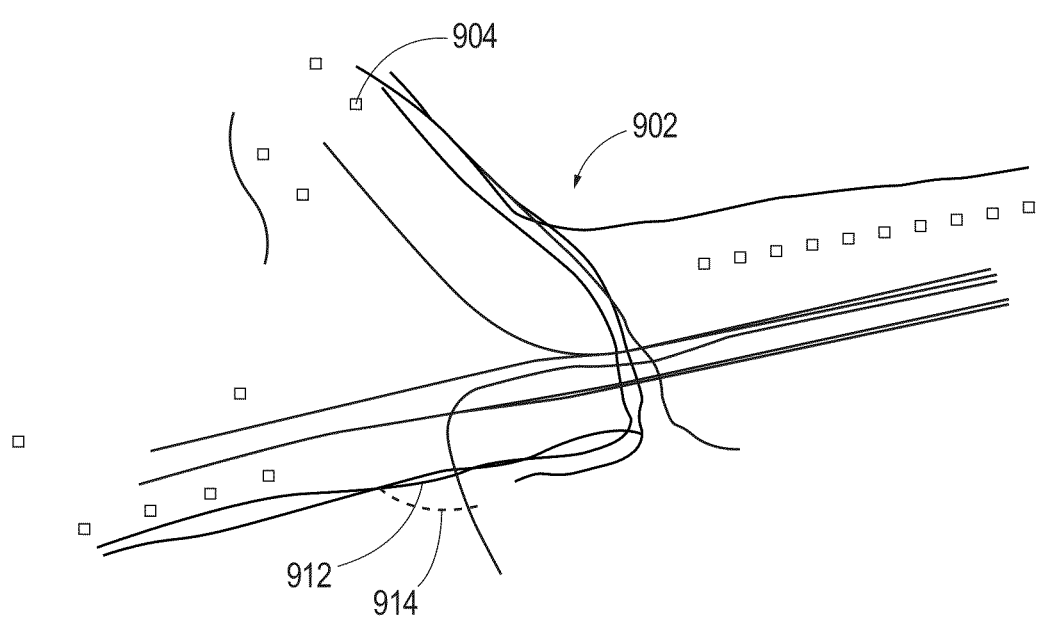
FIG. 14 is a perspective view of predicted trajectories overlaying ground truth trajectories generated by the sensor system based on a fourth dataset.

FIG. 14 depicts the inD dataset, which includes tracks 900 extracted from 33 drone recordings at a traffic intersection 902. For each track 900, metadata such as agent type (i.e., pedestrian, car, truck, bike), width, height, the number of frames in which the agent is present, and a trajectory of the agent. Each track 900 is represented as a feature vector that includes x, y position, heading, and lateral and longitudinal velocity and acceleration of the corresponding agent. The intersection 902 includes, on average, 500 nodes 904 representing agents at the intersection 902.

The positional error from the drone recordings is expected to be less than 10.0 cm. Frames in the recordings by the drones were taken at a 0.2 second interval, resulting in a 4.0 second prediction horizon when evaluating T=20 steps.

The OOD generalization is measured by deploying a model trained on the inD dataset and evaluating performance by the model on a rounD dataset. The rounD dataset is a sister dataset of the inD dataset but for recordings in roundabouts.

FIG. 15 indicates results in processing the inD dataset and the rounD dataset by the models in Table IV. The results shown in Table IV show that the sensor system 102 using the dG-VAE model indicate a 5-10% improvement in accuracy over the dNRI model.

Figure 16:
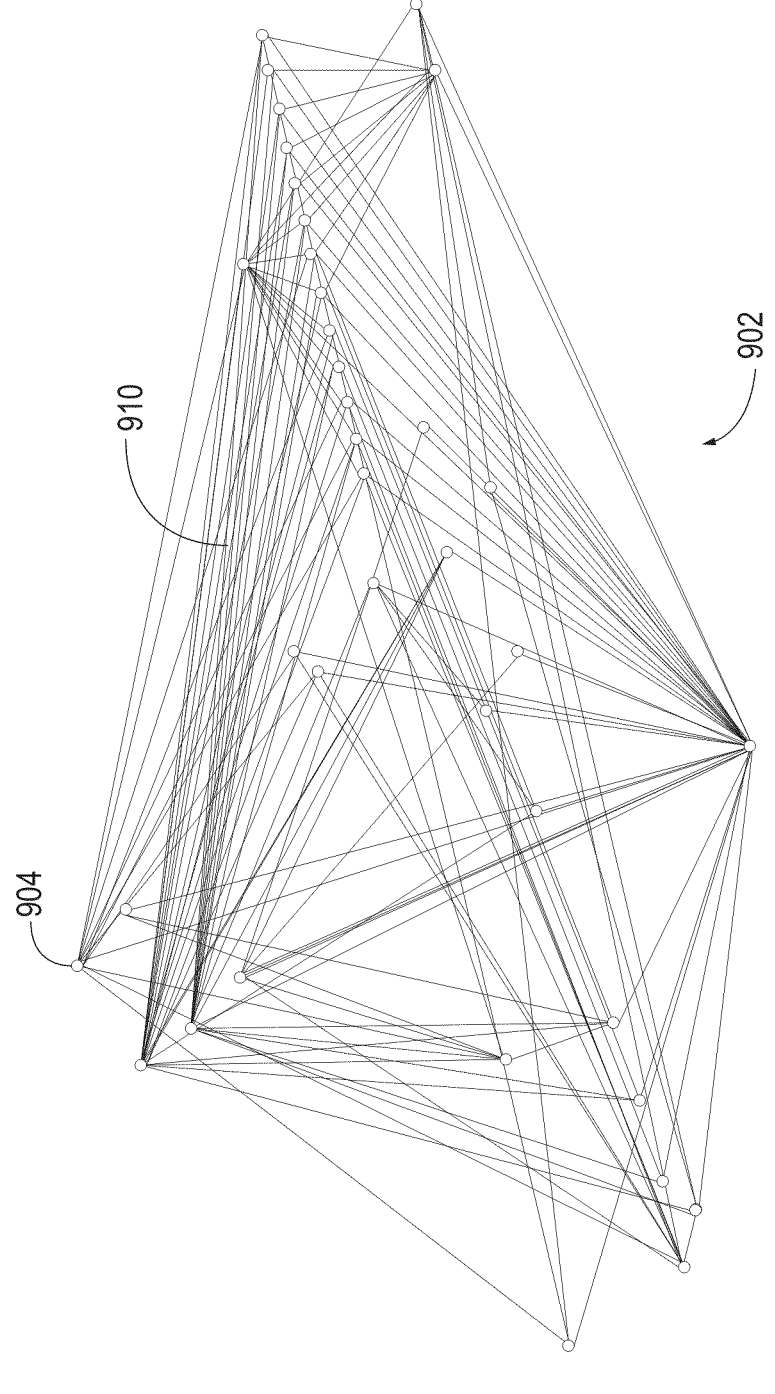
FIG. 16 is a perspective view of a subset of stationary features learned by the sensor system based on the fourth dataset.

FIG. 16 depicts edge features 910 connecting the nodes 904 at the intersection 902. Notably, the edge features 910 improve interpretability of model output. In this regard, FIG. 14 shows predicted trajectories 912 generated by the sensor system 102 using the dG-VAE model. As depicted, the predicted trajectories 912 are represented by solid curves, and overlay ground truth trajectories 914 which are represented by dashed curves.

The predicted trajectories 912 are well matched to the ground truth trajectories 914 with a few exceptions, which deviate slightly towards an end of the tracks 900. FIG. 16 is a visualization of the edge features 910 learned by the dG-VAE model at a same time step of the intersection 902 shown in FIG. 14. As such, the edge features 910 indicate how the dG-VAE model discerns between edges that connect two moving vehicles and edges linking two stationary entities, attributing high-value features to the former and near-zero feature weights to the latter. Edges that link stationary and moving agents demonstrate feature weights that lie somewhere in between. In this manner, the sensor system 102 recognizes connections significant for predicting the future positions of agents at the intersection 902. Further, the sensor system 102 provides interpretability and out-of-distribution generalizability in the context of interaction modeling and behavior prediction for dynamic agents by the dG-VAE model.

Methods for Operating the Information Generation System

Figure 17:
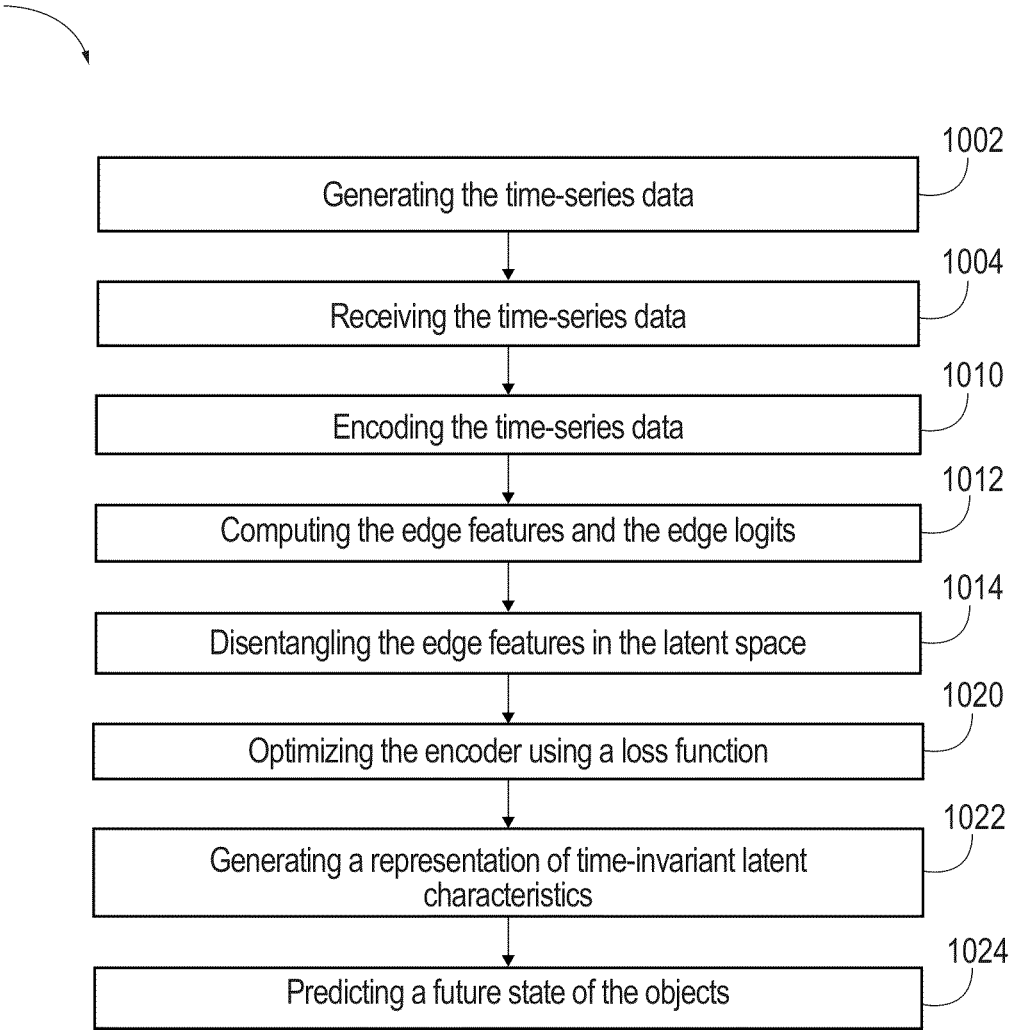
FIG. 17 is an exemplary process for generating a representation of time-invariant latent characteristics of objects in an environment, predicting future states of the objects based on the time-invariant latent characteristics, and causing a vehicle to navigate a path in the environment based on the time-invariant latent characteristics using the system.

Referring to FIG. 17, a computer-implemented method 1000 for generating a representation of time-invariant latent characteristics of objects in an environment, predicting future states of the objects based on the time-invariant latent characteristics, and causing a vehicle to navigate a path in the environment based on the time-invariant latent characteristics will be described according to an exemplary embodiment. FIG. 17 will be described with reference to FIGS. 1-16. For simplicity, the method 1000 will be described as a sequence of blocks, but the elements of the method 1000 may be organized into different architectures, elements, stages, and/or processes.

At block 1002, the method 1000 includes generating the time-series data 122 of the objects 130 in the environment 124 with the ranged sensor 110. At block 1004, the method 1000 includes causing the processor 140 to receive the time-series data 122 generated by the ranged sensor 110. At block 1010, the method 1000 includes causing the processor 140 to encode the time-series data 122 into the edge embeddings 214 with the encoder 202.

At block 1012, the method 1000 includes causing the processor 140 to compute the edge features 234 and the edge logits 242 of the objects 130 in the environment 124, represented in the latent space, based on the edge embeddings 214. At block 1014, the method 1000 includes causing the processor 140 to disentangle the edge features 234 in the latent space. In an embodiment, causing the processor 140 to disentangle the edge features 234 includes processing the edge embeddings 214 using at least one of a restricted labeling algorithm and a pair matching algorithm.

At block 1020, the method 1000 includes causing the processor 140 to optimize the encoder 202 using a loss function that directs learned variables of the edge features 234 to align with a specified attribute. In an embodiment, the specified attribute is a spring constant, such that the loss function causes the encoder 202 to infer a spring constant from the learned variables of the edge features 234.

At block 1022, the method 1000 includes causing the processor 140 to generate a representation of time-invariant latent characteristics of interactions between the edge features 234 in the latent space. At block 1024, the method 1000 includes causing the processor 140 to predict a future state of the objects 130 in the environment 124 with the decoder 212, which receives and processes the edge embeddings 214 from the encoder 202. The decoder 212 includes an edge convolutional layer that generates the node embeddings 230 from the edge embeddings 214, and includes a gated recurrent unit layer that processes the node embeddings 230 with a linear readout.

In an embodiment where the sensor system 102 is incorporated in the vehicle 400, generating the time-series data 122 of the objects 130 with the ranged sensor 110 at block 1002 includes generating the time-series data 122 of the objects 130 in the external environment 402 of the vehicle 400, including the other vehicles 404. Computing the edge features 234 and the edge logits 242 of the objects 130 at block 1012 includes computing the edge features 234 and the edge logits 242 of the other vehicles 404. Generating the representation of time-invariant latent characteristics at block 1022 includes generating a representation of time-invariant latent characteristics of interactions between the edge features 234 of the other vehicles 404 in the latent space. The method 1000 further includes actuating autonomous travel by the vehicle 400 based on the representation of time-invariant latent characteristics.

Figure 18:
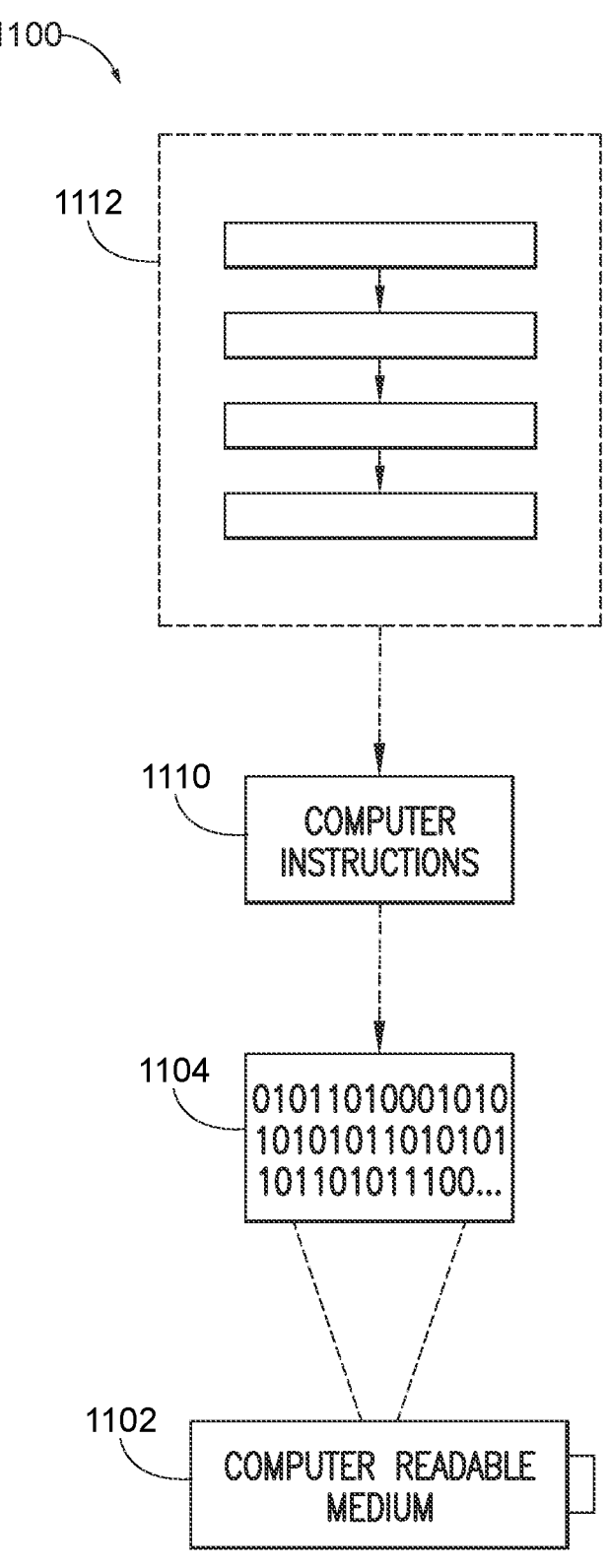
FIG. 18 is an illustration of a computer-readable medium or computer-readable device including processor-executable instructions configured to embody one or more of the provisions set forth herein, according to one aspect.

Still another aspect involves a non-transitory computer-readable medium including processor-executable instructions configured to implement one aspect of the techniques presented herein. An aspect of a computer-readable medium or a computer-readable device devised in these ways is illustrated in FIG. 18, where an implementation 1100 includes a computer-readable medium 1102, such as a CD-R, DVD-R, flash drive, a platter of a hard disk drive, etc., on which is encoded computer-readable data 1104. This encoded computer-readable data 1104, such as binary data including a plurality of zero's and one's as shown in 1104, in turn includes a set of processor-executable computer instructions 1110 configured to operate according to one or more of the principles set forth herein. In this implementation 1100, the processor-executable computer instructions 1110 may be configured to perform a method 1112, such as the method 1000 of FIG. 17. In another aspect, the processor-executable computer instructions 1110 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A sensor system comprising:
   a ranged sensor that generates time-series data indicating positions of objects in an environment; and
   at least one processor that:
   receives the time-series data generated by the ranged sensor,
   encodes the time-series data into edge embeddings with an encoder,
   computes edge features and edge logits of the objects in the environment, represented in a latent space, based on the edge embeddings,
   disentangles the edge features in the latent space, and
   generates a representation of time-invariant latent characteristics of interactions between the edge features in the latent space.

2. The system of claim 1, wherein the processor disentangles the edge features in the latent space using a restricted labeling algorithm that matches the edge logits with a subset of ground truth features.

3. The system of claim 1, wherein the processor optimizes the encoder using a loss function that directs learned variables of the edge features to align with a specified attribute.

4. The system of claim 3, wherein the specified attribute is a spring constant, such that the loss function causes the encoder to infer a spring constant from the learned variables of the edge features.

5. The system of claim 1, wherein the processor records the edge features as time-series data in an edge feature matrix, disentangles the edge features in the latent space using a pair matching algorithm that samples the edge feature matrix to generate a sampled matrix indicating time-series data of the edge features, averages the edge features recorded in the sampled matrix over time to determine time-invariant features, and populates the edge feature matrix with the time-invariant features to determine the time-invariant latent characteristics of edge interactions between the edge features in the latent space.

6. The system of claim 1, wherein the encoder includes a graph neural network (GNN) having a linear embedding followed by an edge convolutional layer configured to concatenate node embeddings obtained from the time-series data, and generate the edge embeddings from the concatenated node embeddings.

7. The system of claim 6, wherein the encoder includes a first multilayer perceptron block that computes the edge logits from the edge embeddings, and includes a second multilayer perceptron block that computes the edge features from the edge embeddings.

8. The system of claim 6, wherein the encoder includes a recurrent neural network (RNN) having a long short-term memory (LSTM) layer configured to receive and process the edge embeddings from the GNN, and the processor computes the edge features and the edge logits of the objects in the environment based on the edge embeddings processed by the RNN.

9. The system of claim 8, wherein the RNN includes a forward RNN that generates a forward embedding based on the edge embeddings from the GNN, and includes a backward RNN that generates a backward embedding based on the edge embeddings from the GNN, and the processor:

computes a prior edge logit based on the forward embedding, computes a posterior edge logit based on the forward embedding and the backward embedding, where the posterior edge logit is computed using future information, trains the prior edge logit to match the posterior edge logit, samples a latent variable from the prior edge logit, and generates the representation of the time-invariant latent characteristics based on the latent variable.

10. The system of claim 8, wherein the processor operates the LSTM layer with an exponential linear unit activation function, and the RNN includes a dropout layer which excludes individual nodes in the encoder from activation based on a probability.

11. The system of claim 1, wherein the processor predicts a future state of the objects in the environment with a decoder that receives and processes the edge embeddings from the encoder.

12. The system of claim 11, wherein the decoder includes an edge convolutional layer that generates node embeddings from the edge embeddings, and includes a gated recurrent unit layer that processes the node embeddings with a linear readout.

13. The system of claim 11, in combination with a vehicle that includes the ranged sensor and the at least one processor, wherein the ranged sensor generates time-series data of the objects in an external environment surrounding the vehicle, the objects including other vehicles, the at least one processor generates the representation of time-invariant latent characteristics of interactions between the edge features representing the other vehicles in the latent space, the at least one processor predicts a future state of the other vehicles in the external environment based on the representation of time-invariant latent characteristics, the at least one processor includes an electronic control unit (ECU) of the vehicle that actuates autonomous travel by the vehicle based on the predicted future state of the other vehicles.

14. The system of claim 1, in combination with a vehicle that includes the ranged sensor and the at least one processor, wherein the ranged sensor generates time-series data of the objects in an external environment surrounding the vehicle, the objects being other vehicles, the at least one processor generates a representation of time-invariant latent characteristics of interactions between the edge features representing the other vehicles in the latent space, and the at least one processor includes an electronic control unit (ECU) of the vehicle that actuates autonomous travel by the vehicle based on the generated representation of time-invariant latent characteristics.

15. A method for generating a representation of time-invariant latent characteristics, the method comprising:

generating time-series data of objects in an environment with a ranged sensor; and causing at least one processor to:

receive the time-series data generated by the ranged sensor;

encode the time-series data into edge embeddings with an encoder;

compute edge features and edge logits of the objects in the environment, represented in a latent space, based on the edge embeddings;

disentangle the edge features in the latent space; and generate a representation of time-invariant latent characteristics of interactions between the edge features in the latent space.

16. The method of claim 15, further comprising causing the at least one processor to optimize the encoder using a loss function that directs learned variables of the edge features to align with a specified attribute, wherein the specified attribute is a spring constant, such that the loss function causes the encoder to infer a spring constant from the learned variables of the edge features.

17. The method of claim 15, wherein causing the processor to disentangle the edge features includes processing the edge embeddings using at least one of a restricted labeling algorithm and a pair matching algorithm.

18. The method of claim 15, further comprising predicting a future state of the objects in the environment with a decoder that receives and processes the edge embeddings from the encoder, wherein the decoder includes an edge convolutional layer that generates node embeddings from the edge embeddings, and includes a gated recurrent unit layer that processes the node embeddings with a linear readout.

19. The method of claim 15, wherein generating the time-series data of the objects with the ranged sensor includes generating time-series data of objects in an external environment of a vehicle, including other vehicles, computing the edge features and the edge logits of the objects includes computing edge features and edge logits of the other vehicles, generating the representation of time-invariant latent characteristics includes generating a representation of time-invariant latent characteristics of interactions between the edge features representing the other vehicles in the latent space, and the method further comprises actuating autonomous travel by the vehicle based on the representation of time-invariant latent characteristics.

20. A non-transitory computer readable storage medium storing instructions that, when executed by at least one processor, causes the at least one processor to perform a method, the method comprising:

generating time-series data of objects in an environment with a ranged sensor;

encoding the time-series data into edge embeddings with an encoder;

computing edge features and edge logits of the objects in the environment, represented in a latent space, based on the edge embeddings;

disentangling the edge features in the latent space; and generating a representation of time-invariant latent characteristics of interactions between the edge features in the latent space.

* * * * *